United States Patent
Chen

(10) Patent No.: US 8,328,208 B2
(45) Date of Patent: Dec. 11, 2012

(54) STROLLER CONNECTABLE WITH A CAR SEAT

(75) Inventor: Shun-Min Chen, Taipei (TW)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 500 days.

(21) Appl. No.: 12/568,133

(22) Filed: Sep. 28, 2009

(65) Prior Publication Data

US 2010/0078916 A1 Apr. 1, 2010

Related U.S. Application Data

(60) Provisional application No. 61/101,819, filed on Oct. 1, 2008.

(51) Int. Cl.
*B62B 7/00* (2006.01)
*B62B 5/00* (2006.01)

(52) U.S. Cl. .................... 280/47.38; 280/642

(58) Field of Classification Search ............ 280/30, 280/31, 47.4, 654, 639, 641, 7.16, 220, 226.1, 280/33.993, 642, 643, 647, 648, 650, 657, 280/658, 87.051, 47.25, 47.38, 47.41; 297/256.16, 297/354.12, 354.1, 256.17, 256.15, 183.4, 297/183.2, 377, 16.2
See application file for complete search history.

(56) References Cited

U.S. PATENT DOCUMENTS

| 5,333,893 | A | * | 8/1994 | Chen ........................... 280/642 |
| 5,676,386 | A | * | 10/1997 | Huang ........................ 280/30 |
| 5,772,279 | A | * | 6/1998 | Johnson, Jr. .................. 297/130 |
| 5,794,951 | A | * | 8/1998 | Corley et al. ................... 280/30 |
| 5,833,261 | A | * | 11/1998 | Brown et al. .................. 280/642 |
| 5,947,555 | A | * | 9/1999 | Welsh et al. .................. 297/130 |
| 6,086,087 | A | * | 7/2000 | Yang ........................... 280/658 |
| D430,076 | S | * | 8/2000 | Gehr ............................ D12/129 |
| 6,209,892 | B1 | * | 4/2001 | Schaaf et al. .............. 280/33.993 |
| 6,286,844 | B1 | * | 9/2001 | Cone et al. .................. 280/47.41 |
| 6,331,032 | B1 | * | 12/2001 | Haut et al. .................... 297/130 |
| 6,398,233 | B1 | * | 6/2002 | Liang et al. ..................... 280/30 |

(Continued)

FOREIGN PATENT DOCUMENTS

CN 200995703 Y 12/2007

(Continued)

OTHER PUBLICATIONS

United Kingdom Office Action dated Dec. 22, 2009.

*Primary Examiner* — J. Allen Shriver, II
*Assistant Examiner* — Jacob Meyer
(74) *Attorney, Agent, or Firm* — Pillsbury Winthrop Shaw Pittman, LLP

(57) ABSTRACT

A stroller includes a stroller frame having a pair of lateral members, a footrest disposed rotatably between the lateral members and having a coupling portion, and a locking device disposed between the footrest and the lateral members and operable to allow for an adjustment to an angle of the footrest with respect to the lateral members. The locking device includes an angle-limiting mechanism and an actuator operable to allow the footrest to be pivoted relative to the lateral members to a selected one of a first angular position and a second angular position. The angle-limiting mechanism locks the footrest at the selected one of the first and second angular positions when the actuator is released. When the footrest is disposed at the first angular position, the coupling portion of the footrest is engageable with a retaining member of a car seat.

10 Claims, 14 Drawing Sheets

U.S. PATENT DOCUMENTS

| | | | |
|---|---|---|---|
| 6,409,205 B1 * | 6/2002 | Bapst et al. | 280/642 |
| 6,513,827 B1 * | 2/2003 | Barenbrug | 280/648 |
| 6,530,591 B2 * | 3/2003 | Huang | 280/650 |
| 6,626,452 B2 * | 9/2003 | Yang et al. | 280/643 |
| 6,641,164 B2 * | 11/2003 | Wood et al. | 280/648 |
| 6,702,316 B2 * | 3/2004 | Hsia | 280/648 |
| 6,793,280 B2 * | 9/2004 | Washizuka et al. | 297/130 |
| 6,802,514 B2 * | 10/2004 | Worth et al. | 280/30 |
| 6,863,286 B2 * | 3/2005 | Eros et al. | 280/47.38 |
| 6,893,031 B2 * | 5/2005 | Suzuki | 280/47.36 |
| 6,923,467 B2 * | 8/2005 | Hsia | 280/648 |
| 6,983,986 B2 * | 1/2006 | Jane Santamaria | 297/130 |
| 6,986,518 B1 * | 1/2006 | Besaw | 280/30 |
| 7,017,921 B2 * | 3/2006 | Eros | 280/47.38 |
| 7,032,922 B1 * | 4/2006 | Lan | 280/648 |
| 7,070,197 B2 * | 7/2006 | Chen | 280/642 |
| 7,370,913 B2 * | 5/2008 | Takamizu et al. | 297/256.16 |
| 7,377,537 B2 * | 5/2008 | Li | 280/650 |
| 7,419,181 B2 * | 9/2008 | Kassai et al. | 280/642 |
| 7,445,229 B2 * | 11/2008 | Dotsey et al. | 280/642 |
| 7,475,900 B2 * | 1/2009 | Cheng | 280/642 |
| 7,513,512 B2 * | 4/2009 | Yoshie et al. | 280/47.38 |
| 7,600,775 B2 * | 10/2009 | Chen et al. | 280/650 |
| 7,614,641 B2 * | 11/2009 | Hartenstine et al. | 280/642 |
| 7,938,435 B2 * | 5/2011 | Sousa et al. | 280/658 |
| 2002/0093177 A1 * | 7/2002 | Chen | 280/647 |
| 2002/0109320 A1 * | 8/2002 | Wood et al. | 280/47.38 |
| 2003/0075903 A1 * | 4/2003 | Hsia | 280/648 |
| 2003/0080536 A1 * | 5/2003 | Hartenstine et al. | 280/642 |
| 2003/0111825 A1 * | 6/2003 | Lo et al. | 280/642 |
| 2004/0032103 A1 * | 2/2004 | Hsia | 280/47.38 |
| 2004/0094922 A1 * | 5/2004 | Eros | 280/47.38 |
| 2004/0124610 A1 * | 7/2004 | Hou et al. | 280/642 |
| 2004/0124611 A1 * | 7/2004 | Gong et al. | 280/642 |
| 2004/0245747 A1 * | 12/2004 | Hsia | 280/642 |
| 2005/0093259 A1 * | 5/2005 | Williams | 280/47.38 |
| 2005/0127640 A1 * | 6/2005 | Worth et al. | 280/642 |
| 2005/0242535 A1 * | 11/2005 | Chen | 280/47.38 |
| 2005/0242549 A1 * | 11/2005 | Longenecker et al. | 280/642 |
| 2006/0119079 A1 * | 6/2006 | Yoshie et al. | 280/648 |
| 2007/0001429 A1 * | 1/2007 | Maciejczyk | 280/642 |
| 2007/0108710 A1 * | 5/2007 | Pennisi et al. | 280/47.38 |
| 2007/0194545 A1 * | 8/2007 | Van Dijk | 280/47.38 |
| 2008/0157491 A1 * | 7/2008 | Chen et al. | 280/30 |
| 2009/0127827 A1 * | 5/2009 | Pike et al. | 280/648 |

FOREIGN PATENT DOCUMENTS

| | | |
|---|---|---|
| EP | 1 591 339 | 11/2005 |

* cited by examiner

STROLLER CONNECTABLE WITH A CAR SEAT

CROSS-REFERENCE TO RELATED APPLICATION

This application claims priority of U.S. Provisional Patent Application No. 61/101,819, filed on Oct. 1, 2008.

BACKGROUND OF THE INVENTION

1. Field of the Invention

This invention relates to a stroller, and more particularly to a stroller connectable with a car seat.

2. Description of the Related Art

To protect small children from injuries, car seats have been required by laws inmost countries for small children. Therefore, when traveling with a child in an automobile, it is necessary to mount a car seat in the automobile for accommodating the child. Furthermore, when getting off the automobile, it is necessary to move the child from the car seat onto a stroller.

To solve this problem, strollers have been designed to be connectable with a car seat. For example, U.S. Pat. No. 6,331,032 discloses a stroller including a restraining member connected to a stroller frame for preventing a child from falling from a seat. The restraining member may be a tray or an arm bar. U.S. Pat. No. 7,017,921 discloses a stroller including a tray for coupling with a car seat. Chinese Utility Model No. 200995703 discloses a stroller including a footrest plate for coupling with a car seat.

Since such strollers have a coupling structure connectable with a car seat, it is not necessary to move the child from the car seat onto the stroller. That is, the car seat together with the child can be moved directly from the automobile onto the stroller. To increase the options of consumers, however, it is desirable that a stroller includes other coupling structure operable easily to couple with a car seat.

SUMMARY OF THE INVENTION

An object of this invention is to provide a stroller that can be connected to a car seat by a footrest of the stroller.

Another object of this invention is to provide an assembly of a stroller and a car seat that is connectable with the stroller by a footrest of the stroller.

According to an aspect of this invention, there is provided with a stroller adapted to be connected with a car seat, the car seat including a retaining member, the stroller comprising:

a stroller frame having a pair of lateral members;

a footrest disposed rotatably between the lateral members and having a coupling portion; and a locking device disposed between the footrest and the lateral members and operable to allow for an adjustment to an angle of the footrest with respect to the lateral members, the locking device including an angle-limiting mechanism and an actuator operable to allow the footrest to be pivoted relative to the lateral members to a selected one of a first angular position and a second angular position, the angle-limiting mechanism locking the footrest at the selected one of the first and second angular positions when the actuator is released, the coupling portion of the footrest being adapted to engage the retaining member when the footrest is disposed at the first angular position.

According to another aspect of this invention, there is provided with a car seat and stroller assembly comprising:

a car seat including a retaining member; and a stroller including a stroller frame having a pair of lateral members, a footrest disposed rotatably between the lateral members and having a coupling portion, and a locking device disposed between the footrest and the lateral members and operable to allow for an adjustment to an angle of the footrest with respect to the lateral members, the locking device including an angle-limiting mechanism and a actuator operable to allow the footrest to be pivoted relative to the lateral members to a selected one of a first angular position and a second angular position, the angle-limiting mechanism locking the footrest at the selected one of the first and second angular positions when the actuator is released, the coupling portion of the footrest being adapted to engage the retaining member when the footrest is disposed at the first angular position.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
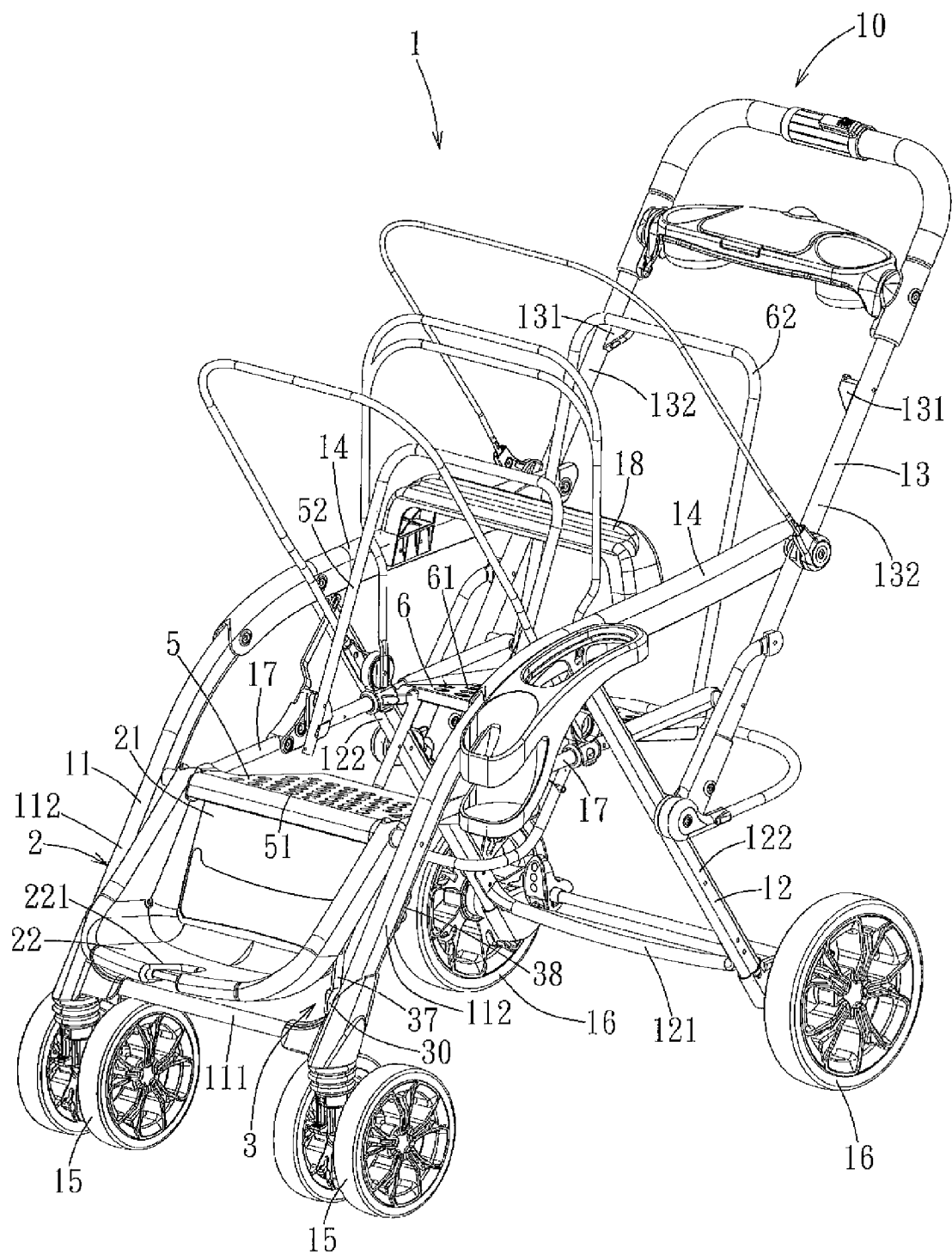
FIG. 1 is a perspective view of the first preferred embodiment of a stroller according to this invention when a footrest is disposed at a second angular position.

Before the present invention is described in greater detail in connection with the preferred embodiments, it should be noted that similar elements and structures are designated by like reference numerals throughout the entire disclosure.

Figure 3:
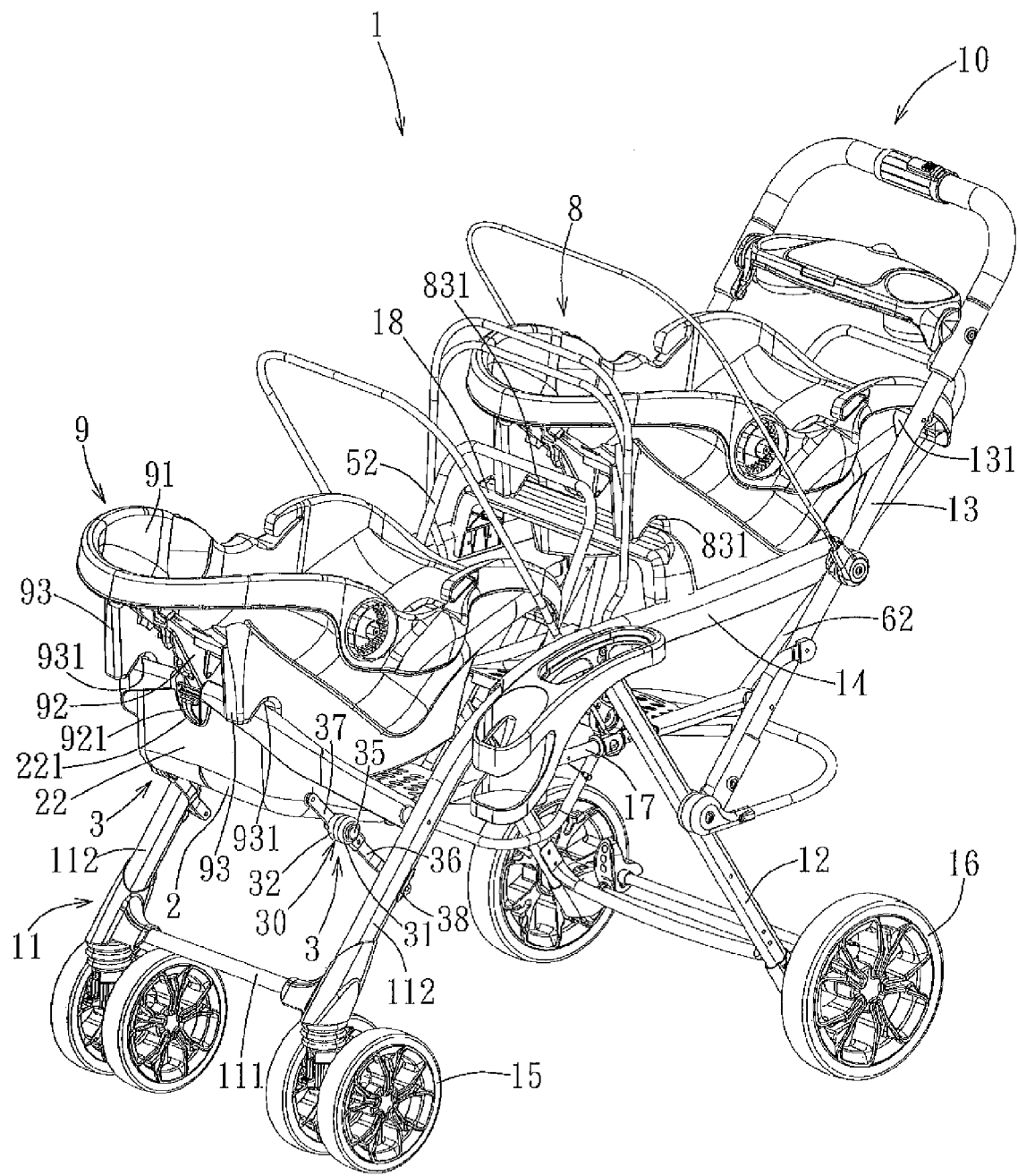
FIG. 3 is a perspective view of the first preferred embodiment and two car seats when the footrest is disposed at a first angular position.

Referring to FIGS. 1 and 3, the first preferred embodiment of a stroller 1 according to this invention is connectable with a first car seat 9. The first car seat 9 includes a seat body 91 for accommodating a child (not shown). The seat body 91 has a middle ridge wall 92 and two side ridge walls 93 flanking the central ridge wall 92. The middle ridge wall 92 is provided with a retaining member 921. Each of the side ridge walls 92 has a concaved portion 931. The retaining member 921 is configured as a hook.

The stroller 1 is a tandem stroller, and includes a stroller frame 10, a front seat portion 5, a rear seat portion 6 disposed behind the front seat portion 5, a footrest 2, and two locking devices 3.

The stroller frame 10 includes a front leg frame 11, a rear leg frame 12, a back frame 13, two upper side rods 14, two lower side rods 17, a transverse rod 18, a pair of front wheels 15, and a pair of rear wheels 16.

The front leg frame 11 is generally U-shaped, and includes a front leg rod 111, and two lateral members connected respectively to two opposite ends of the front leg frame 11 and spaced apart from each other. In this embodiment, the lateral members are respectively two front leg side rods 112. The front wheels 15 are disposed respectively on bottom ends of the front leg side rods 112. Each of the upper side rods 14 extends in a generally horizontal direction. The transverse rod 18 is connected between the upper side rods 14. The rear leg frame 12 is generally U-shaped, and includes a rear leg transverse rod 121, an two rear leg side rods 122 connected respectively to two opposite ends of the rear leg transverse rod 121. The rear leg side rods 122 have top ends connected respectively to the upper side rods 14. The rear wheels 16 are disposed respectively on bottom ends of the rear leg side rods 122. The back frame 13 is generally inverted U-shaped, and includes two back frame side rods 132 having bottom ends connected respectively to the rear leg side rods 122. The upper side rods 14 have rear ends connected respectively to the back frame side rods 132. Each of the back frame side rods 132 is formed with a retaining block 131. The lower side rods 17 are spaced apart from each other, and extend horizontally. Each of the lower side rods 17 is disposed under the corresponding upper side rod 14, and is connected to the corresponding front leg side rod 112, the corresponding rear leg side rod 122, and the corresponding back frame side rod 132.

The front seat portion 5 includes a seat plate 51 and an inverted U-shaped back rod 52. The seat plate 51 is disposed between the lower side rods 17. Bottom ends of the back rod 52 are connected respectively to the lower side rods 17 so as to allow for reclining adjustment of the back rod 52 within a predetermined range.

The footrest 2 is disposed rotatably between the front leg side rods 112. In this embodiment, two opposite sides of a top end of the footrest 2 are connected respectively and pivotally to the front leg side rods 112. The footrest 2 includes a connecting plate 21 connected pivotally to the front leg side rods 112, and a footrest plate 22 substantially perpendicular to the connecting plate 21 and having a coupling portion 221 at a front portion thereof. In this embodiment, the coupling portion 221 is configured as a groove, and is formed through the footrest plate 22.

The locking devices 3 are disposed respectively at left and right sides of the connecting plate 21 of the footrest 2. Each of the locking devices 3 is disposed between the connecting plate 21 and the corresponding front leg side rod 112, and is operable to allow for an adjustment to the angle between the footrest 2 and the corresponding front leg side rod 112.

Each of the locking devices 3 includes an angle-limiting mechanism 30, an actuator 35, a first connecting rod 36, and a second connecting rod 37. The actuators 35 can be operated to allow the footrest 2 to be pivoted relative to the front leg side rods 112 between a first angular position shown in FIGS. 3 and 4 and a second angular position shown in FIGS. 1 and 2. One of the locking mechanisms 3 will be described in the succeeding paragraphs.

Referring to FIGS. 3, 5, 6, and 7, the angle-limiting mechanism 30 includes a first pivot member 31, a second pivot member 32 connected rotatably to the first pivot member 31, a positioning member 33 disposed between the first and second pivot members 31, 32 for positioning the first pivot member 31 relative to the second pivot member 32 at a selected one of a first locking position and a second locking position, and a resilient member 34 for biasing the positioning member 33 in a predetermined direction to maintain the first pivot member 31 in a locked state. The first connecting rod 36 has one end connected fixedly to the first pivot member 31, and the other end connected pivotally to a coupling member 38 of the corresponding front leg side rod 112. The second connecting rod 37 has one end connected fixedly to the second pivot member 32, and the other end connected pivotally to the footrest 2. The actuator 35 is disposed at an axial end of the angle-limiting mechanism 30, and is operable to apply an axial force to the resilient member 34 so as to release the footrest 2 from the corresponding front leg side rod 112.

The second pivot member 32 is configured as a sleeve, and includes a pivot shaft 321 extending toward the first pivot member 31, and a pair of guiding portions 322 disposed on an inner surface thereof.

The positioning member 33 has a through hole 333 permitting the pivot shaft 321 of the second pivot member 32 to extend movably therethrough, a pair of first engaging grooves 331, and a pair of second engaging grooves 332. The first engaging grooves 331 in the positioning member 33 engage respectively the guiding portions 322 of the second pivot member 32 so as to prevent relative rotation of the positioning member 33 and the second pivot member 32, while permitting relative axial movement of the positioning member 33 and the second pivot member 32.

The first pivot member 31 is formed with two engaging blocks 311 that are engageable respectively with the first engaging grooves 331 or the second engaging grooves 332. When the engaging blocks 311 engage respectively the first engaging grooves 331, the first pivot member 31 is disposed at the first locking position such that the first and second connecting rods 36, 37 are aligned with each other, so that the footrest 3 is disposed at the first angular position. In this position, an assembly of the first and second connecting rods 36, 37 is in an unfolded state. When the engaging blocks 311 engage respectively the second engaging grooves 332, the first pivot member 31 is disposed at the second locking position, so that the footrest 2 is disposed in the second angular position. In this position, the assembly of the first and second connecting rods 36, 37 is in a folded state.

The resilient member 34 is disposed between the second pivot member 32 and the positioning member 33 along an axial direction of the pivot shaft 321.

The actuator 35 includes three projecting rods 351 each having a barbed end 352. The three projecting rods 351 extend through the first pivot member 31 to contact the positioning member 33. When the actuator 35 is pressed, the barbed ends 352 push the positioning member 33 away from the first pivot member 31 so as to compress the resilient member 34, thereby removing the positioning member 33 from the first pivot member 31 to allow for relative rotation of the first and second pivot members 31, 32 and, thus, angle adjustment of the footrest 2. After such angle adjustment of the footrest 2, the actuator 35 is released to thereby engage the engaging blocks 311 with a corresponding one pair of the first and second engaging grooves 331, 332 due to the biasing action of the resilient member 34. Hence, the footrest 2 is locked relative to the front leg side rods 112.

Figure 2:
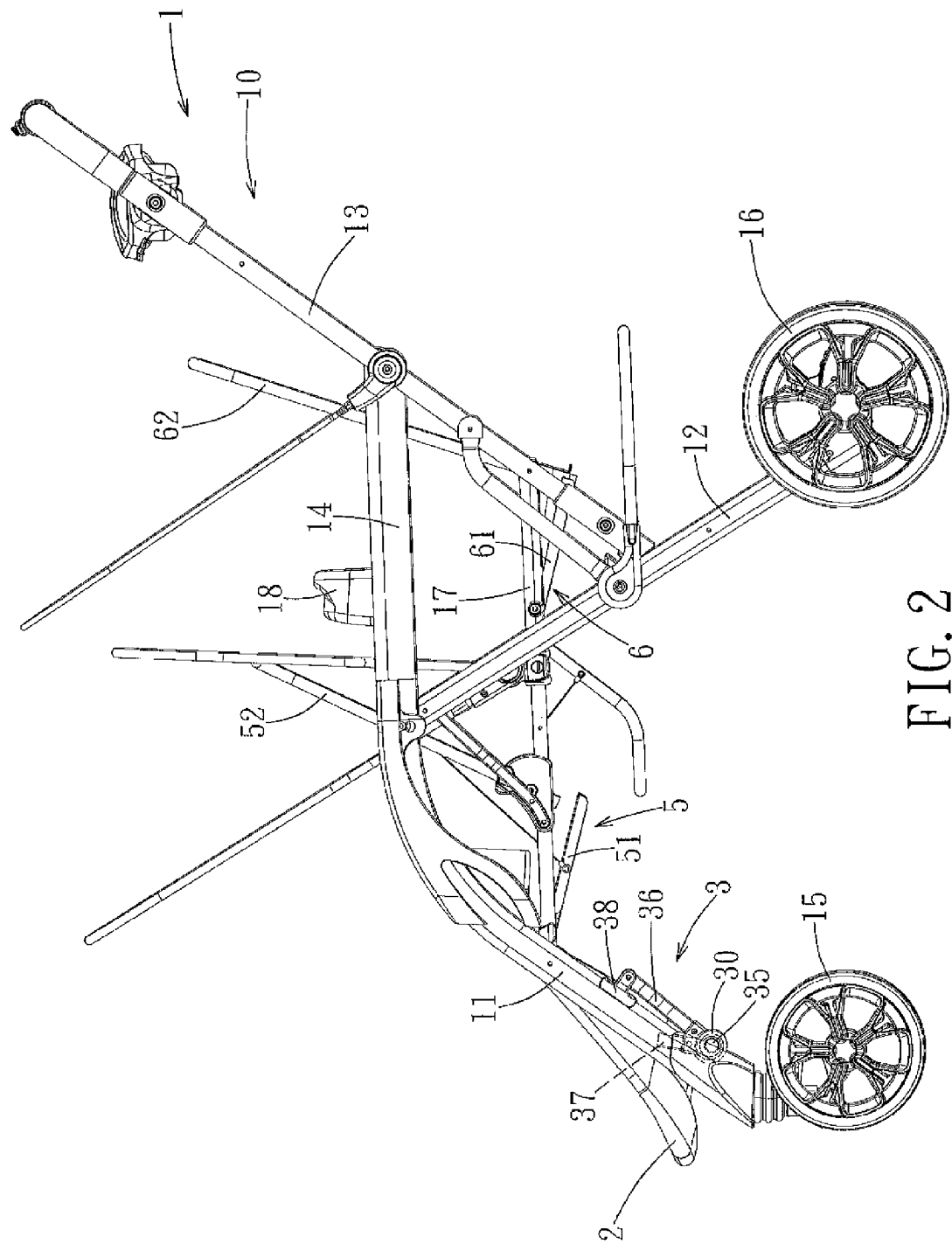
FIG. 2 is a side view of the first preferred embodiment when the footrest is disposed at the second angular position.

With particular reference to FIGS. 1 and 2, when the stroller 1 is used independently (i.e., is not connected with the first car seat 9), the footrest 2 is disposed at the second angular position. In this position, when the child is seated on the front seat portion 5, the feet of the child can be placed on the footrest 2.

Figure 4:
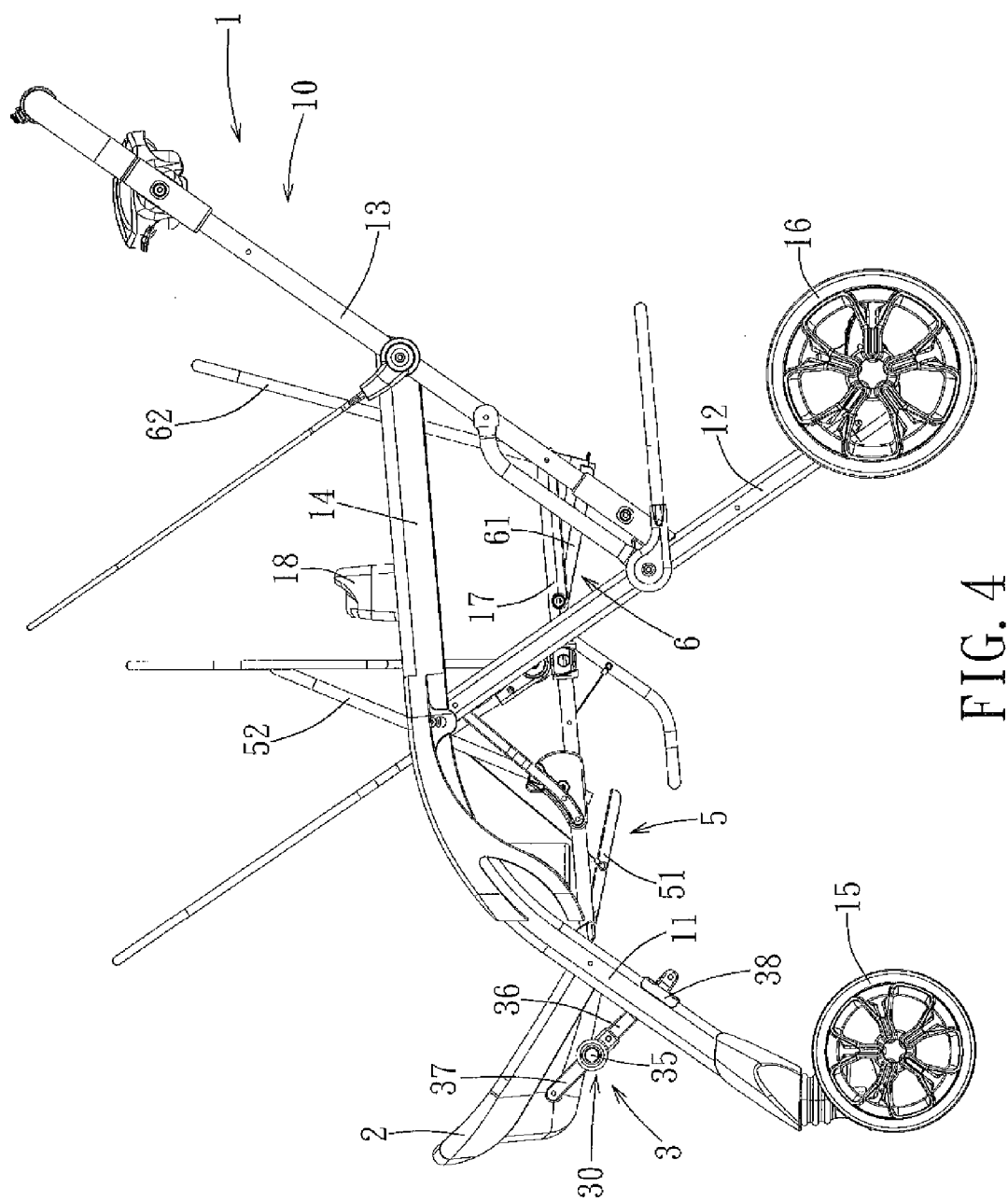
FIG. 4 is a side view of the first preferred embodiment when the footrest is disposed at the first angular position.
Figure 5:
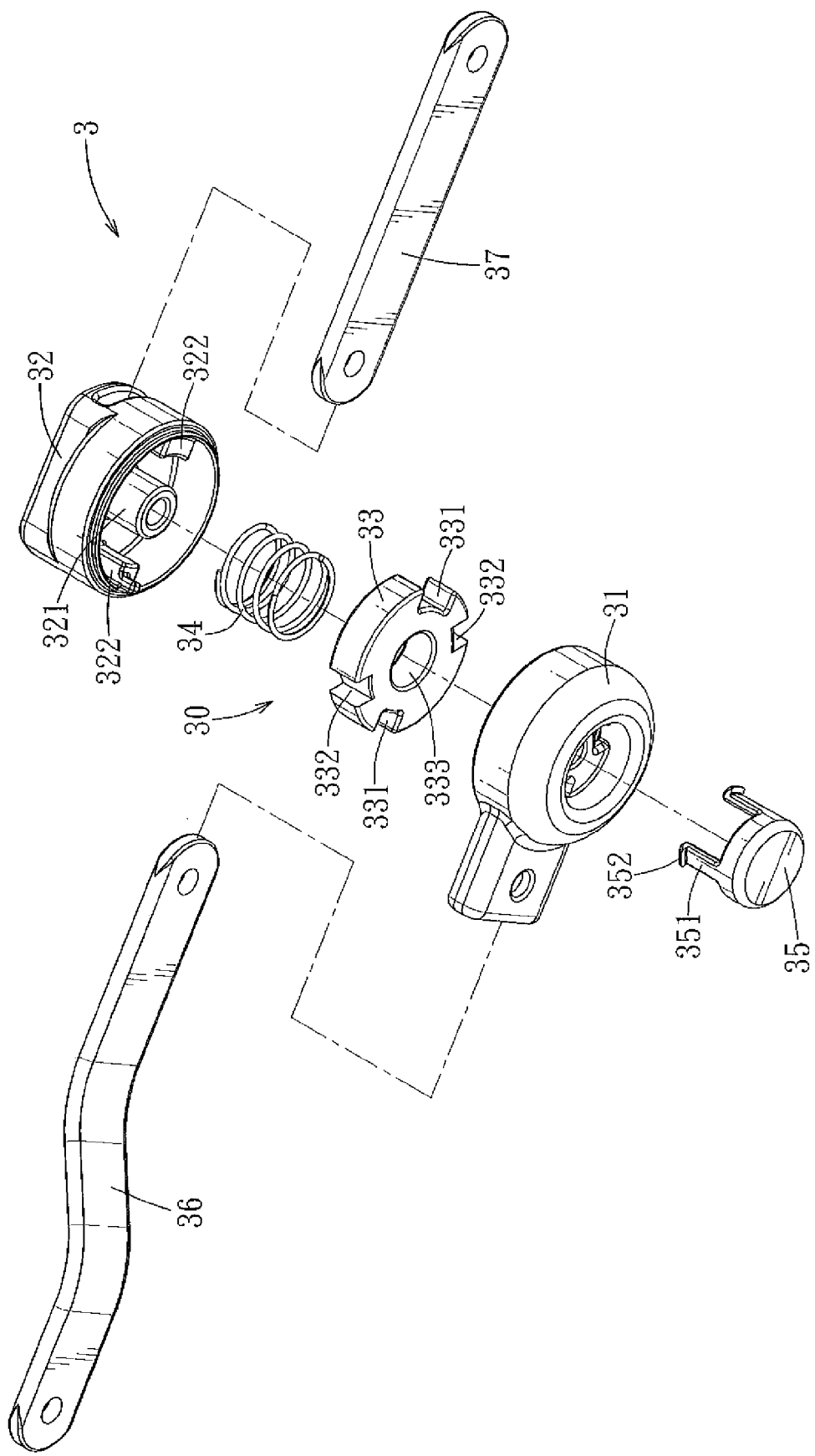
FIG. 5 is an exploded perspective view of a locking device of the first preferred embodiment.
Figure 6:
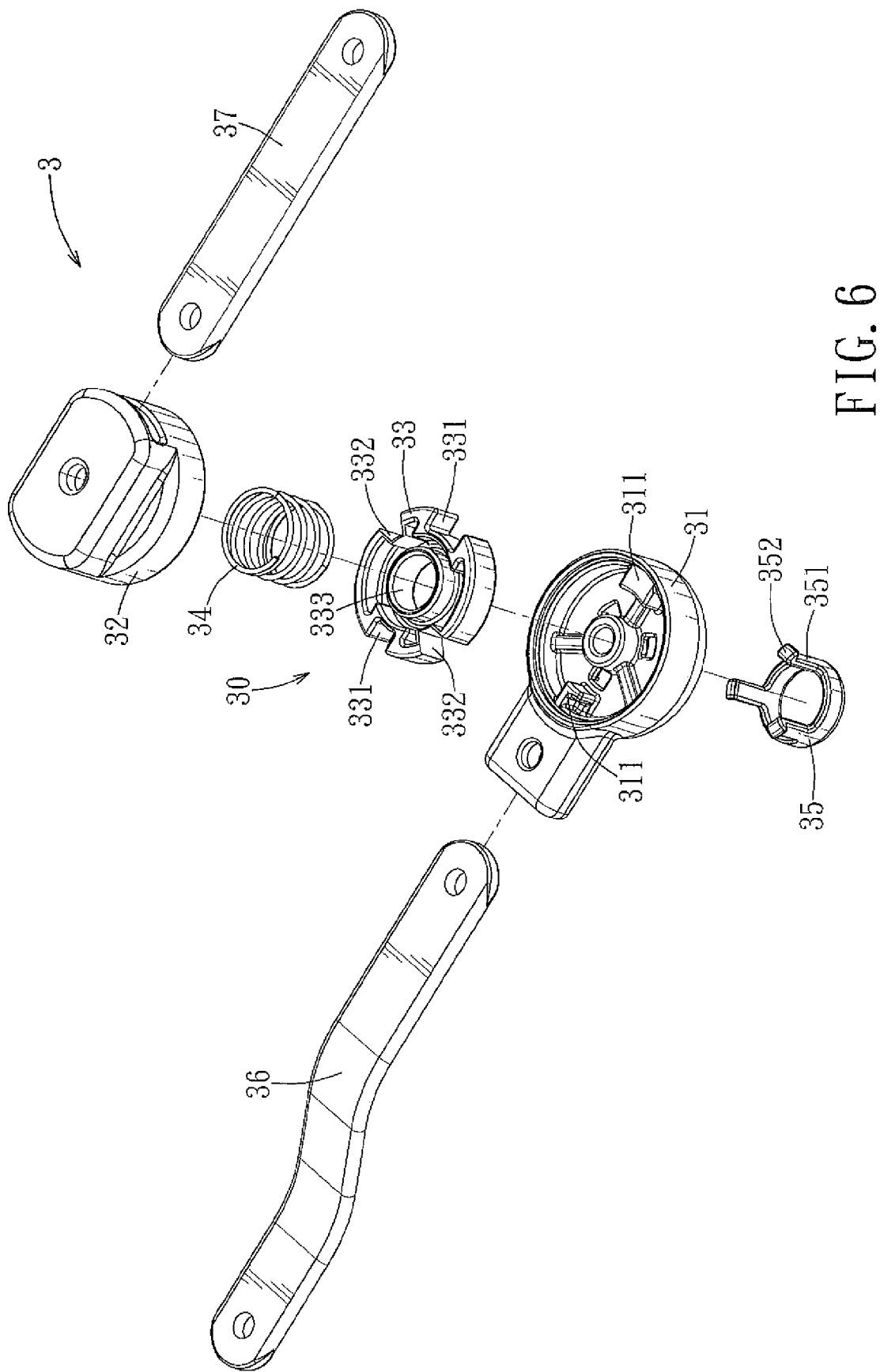
FIG. 6 is an exploded perspective view of the locking device of the first preferred embodiment, viewed at a different angle.
Figure 7:
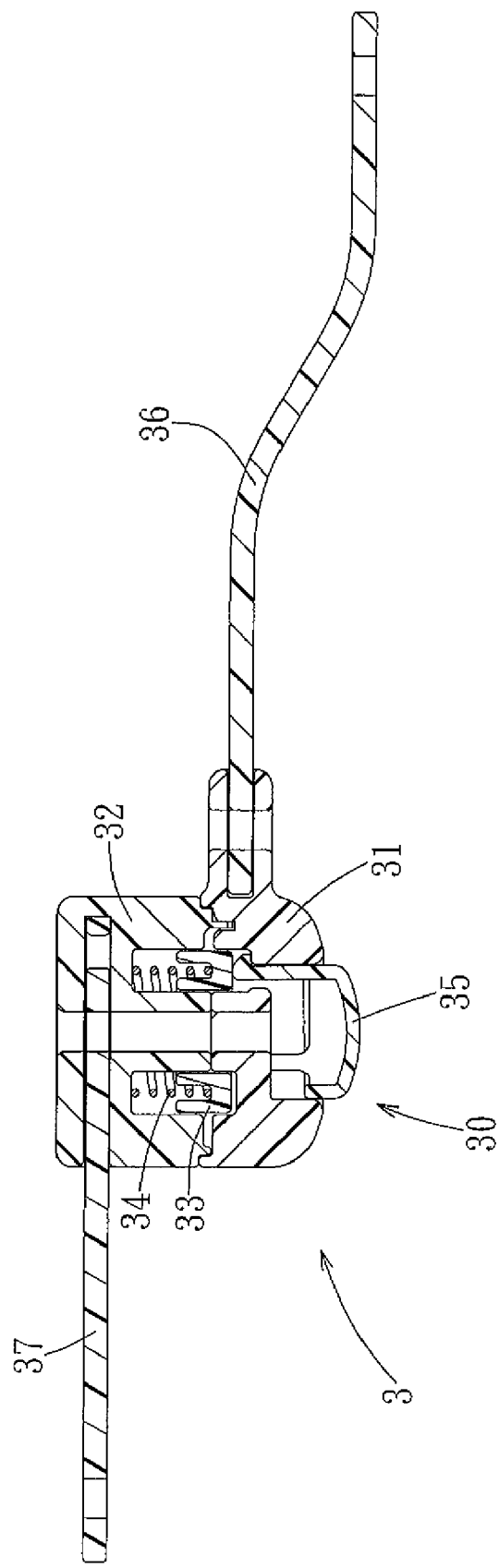
FIG. 7 is a sectional view of the locking device of the first preferred embodiment.

With particular reference to FIGS. 3 and 4, when coupling of the first car seat 9 with the stroller 1 is desired, through operation of the actuators 35, the footrest 2 is first pivoted from the second angular position to the first angular position. Next, the first car seat 9 is placed on the front seat portion 5 such that the retaining member 921 of the first car seat 9 is extended through the coupling portion 221 of the footrest 2 to thereby complete an assembly of the stroller 1 and the first car seat 9.

The rear seat portion 6 can also be coupled with a second car seat 8 having the same structure as the first car seat 9. During the coupling of the rear seat portion 6 with the second car seat 8, the transverse rod 18 engages the concaved portions 831 of the second car seat 8, and the retaining blocks 131 abut against a rear end of the second car seat 8, so as to support and retain the second car seat 8 on the rear seat portion 6.

With such design, the front and rear seat portions 5, 6 of the stroller 1 can be used to support the first and second car seats 9, 8, respectively, or two children, respectively.

When it is desired to remove the first car seat 9 from the stroller 1, the retaining member 921 of the first car seat 9 is separated from the coupling portion 221 of the footrest 2. Subsequently, the first car seat 9 is moved upwardly away from the stroller 1. Thereafter, through operation of the actuators 35, the footrest 2 can be pivoted from the first angular position to the second angular position, thereby allowing a child to be supported by the first seat portion 5 of the stroller 1.

Figure 8:
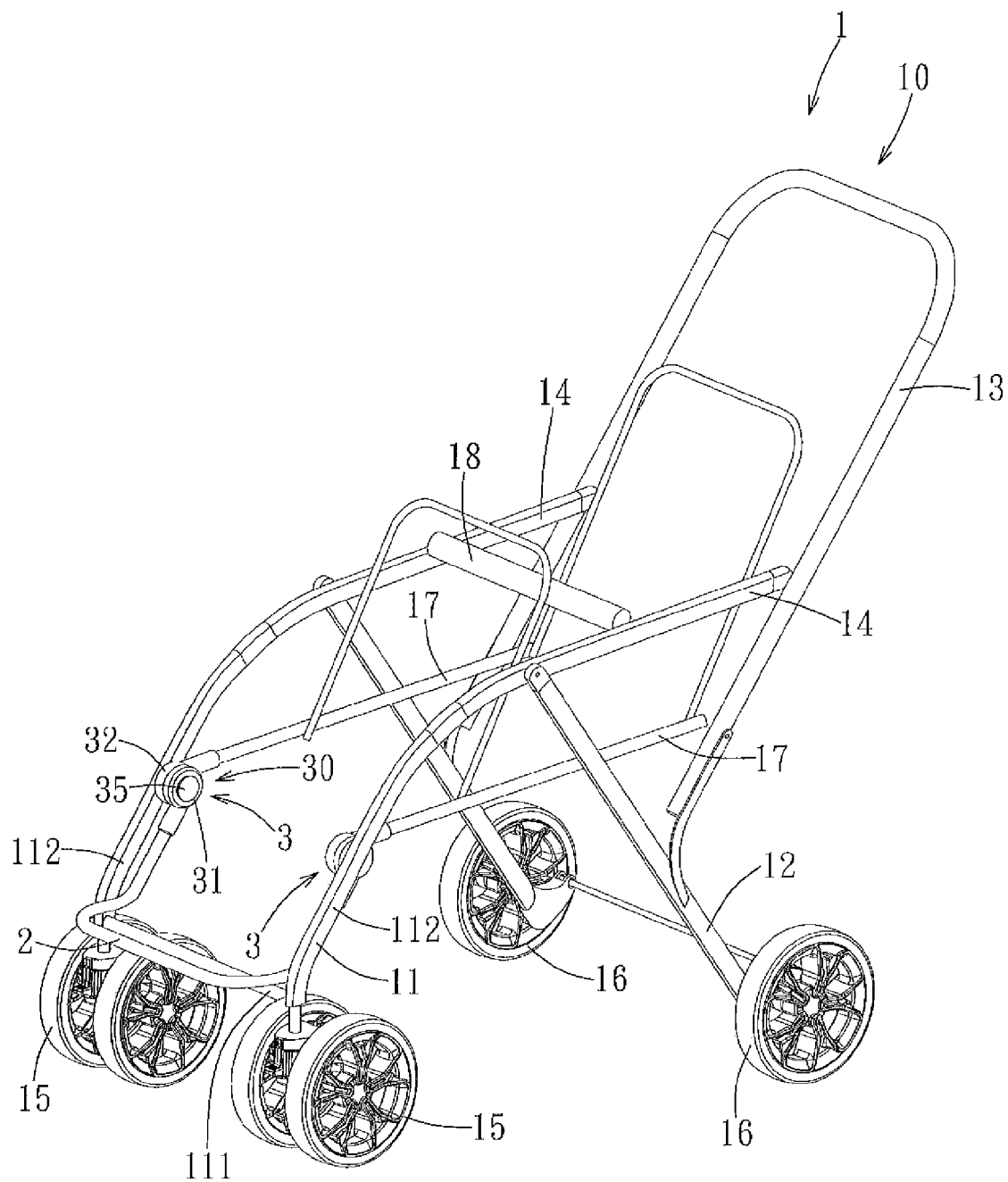
FIG. 8 is a perspective view of the second preferred embodiment of a stroller according to this invention when a footrest is disposed at a second angular position.
Figure 9:
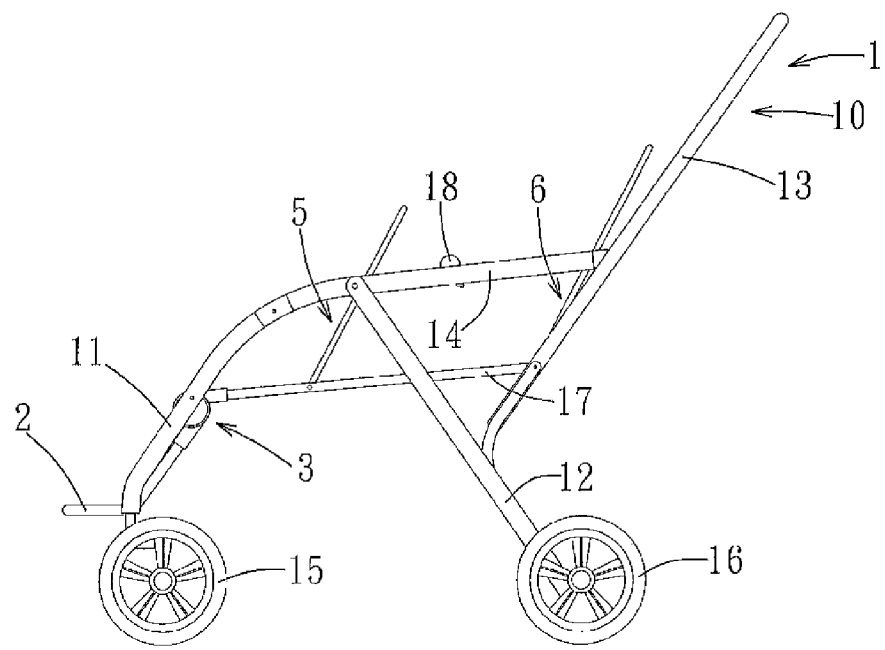
FIG. 9 is a side view of the second preferred embodiment when the footrest is disposed at the second angular position.
Figure 10:
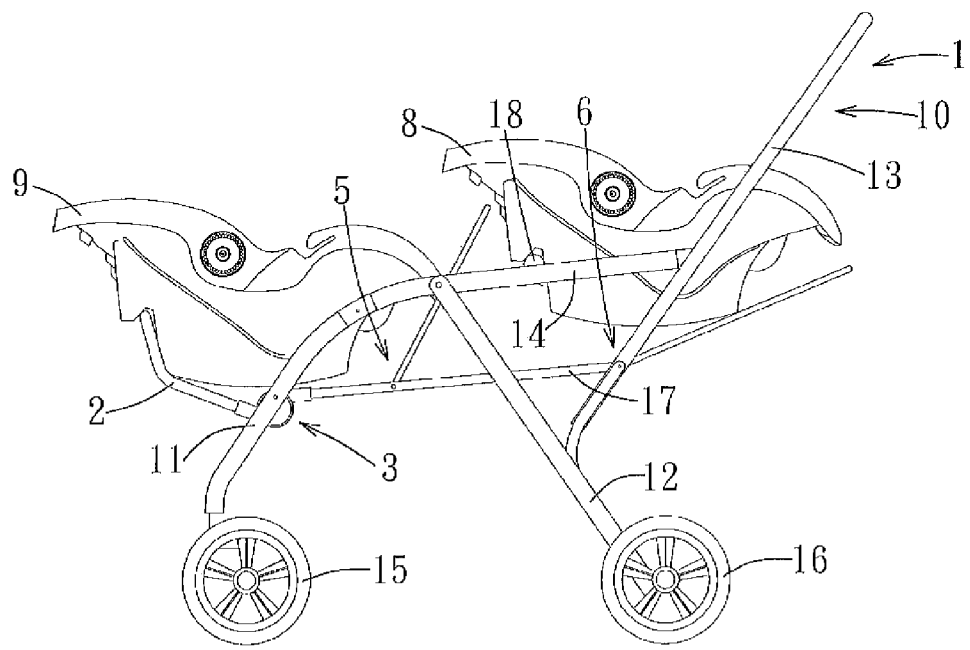
FIG. 10 is a side view of the second preferred embodiment and two car seats when the footrest is disposed at a first angular position.

FIGS. 8, 9, and 10 show the second preferred embodiment of a stroller 1 according to this invention, which differs from the first preferred embodiment in the design of the locking devices 3.

In this embodiment, the locking devices 3 are disposed respectively at left and right sides of the footrest 2. Each of the locking devices 3 is disposed between the footrest 2 and the corresponding front leg side rod 112, and includes an angle-limiting mechanism 30 and an actuator 35. The actuator 35 can be operated to allow the footrest 2 to be pivoted between a first angular position shown in FIG. 10 and a second angular position shown in FIGS. 8 and 9.

The locking mechanism 30 is similar in construction to the first preferred embodiment. Unlike the first preferred embodiment, for each of the locking mechanisms 3, the first pivot member 31 is connected directly and fixedly to the footrest 2, and the second pivot member 32 is connected directly and fixedly to the corresponding front leg side rod 112. As such, the footrest 2 can be adjusted between the first and second angular positions relative to the front leg side rods 112 without assistance of the first and second connecting rods 36, 37.

With particular reference to FIGS. 8 and 9, when independent use of the stroller 1 is desired, the footrest 2 is disposed at the second angular position, so that the child can be seated on the front seat portion 5 in such a manner that the feet of the child is placed on the footrest 2.

With particular reference to FIG. 10, when it is desired to connect the first car seat 9 with the stroller 1, the footrest 2 is first pivoted from the second angular position to the first angular position. Next, the first car seat 9 is connected to the stroller 1.

After the first car seat 9 is removed from the stroller 1, through operation of the actuator 35, the footrest 2 can be adjusted from the first angular position to the second angular position to convert the stroller 1 back into the independent use state.

FIGS. 11 to 16 show the third preferred embodiment of a stroller 1 according to this invention. The main difference between this embodiment and the first preferred embodiment resides in the following. The footrest 2 is connected pivotally to the seat plate 51 of the front seat portion 5.

Two locking devices 4 are disposed respectively at left and right sides of a back surface of the connecting plate 21 of the footrest 2. Each of the locking devices 4 is disposed between the footrest 2 and the corresponding front leg side rod 112.

Each of the locking devices 4 includes an angle-limiting mechanism 40 and an actuator 43. The actuator 43 can be operated to allow the footrest 2 to be pivoted relative to the front leg side rods 112 among a first angular portion shown in FIG. 13, a second angular position shown in FIGS. 11 and 12, and a third angular position shown in FIG. 14. One of the locking devices 4 will be described in the succeeding paragraphs.

The angle-limiting mechanism 40 includes a sliding rail 41 disposed on the back surface of the footrest 2, a sliding block 42 movable along the sliding rail 41, a connecting rod 46 having two ends connected respectively to the sliding block 42 and a coupling member 47 of the corresponding front leg side rod 112, a positioning pin 44 projecting from the sliding block 42, and a resilient member 45 for biasing and maintaining the positioning pin 44 in a locked state.

The sliding rail 41 has a first positioning hole 411, a second positioning hole 412, and a third positioning hole 413. The first positioning hole 411 is disposed between the second and third positioning holes 412, 413.

The actuator 43 is disposed pivotally on the sliding block 42 by a rotating shaft 421 at an intermediate portion thereof so as to allow for pivoting movement thereof relative to the sliding block 42. The resilient member 45 and the positioning pin 44 are connected to the actuator 43, and are located respectively at two opposite sides of the rotating shaft 421.

The positioning pin 44 is connected to an inner surface of a first end 431 of the actuator 43, and is movable relative to the sliding rail 41 to engage a selected one of the first, second, and third positioning holes 411, 412, 413. When the positioning pin 44 engages the first positioning hole 411, the sliding block 42 is locked at a first locking position relative to the sliding rail 41 such that the junction between the connecting rod 46 and the sliding block 42 is located at a front end of the connecting rod 46, and the footrest 2 is disposed at a first angular position shown in FIG. 13. When the positioning pin 44 engages the second positioning hole 412, the sliding block 42 is locked at a second locking position relative to the sliding rail 41 such that the junction between the connecting rod 46 and the sliding block 42 is located at a lower end of the connecting rod 46, and the footrest 2 is disposed at a second angular position shown in FIG. 12. When the positioning pin 44 engages the third positioning hole 413, the sliding block 42 is located at a third locking position relative to the sliding rail 91 such that the junction between the connecting rod 46 and the sliding block 42 is located at an upper end of the connecting rod 46, and the footrest 3 is disposed at a third angular position shown in FIG. 14.

The resilient member 45 is disposed at a second end 432 of the actuator 93, and has two ends abutting respectively against the second end 432 of the actuator 43 and the sliding block 42. As such, the positioning pin 44 is biased by the resilient member 45 into the selected one of the first, second, and third positioning holes 411, 412 and 413 to lock the sliding block 42 relative to the sliding rail 41.

When the second end 432 of the actuator 45 is pressed, the positioning pin 44 is removed from the selected one of the first, second, and third positioning holes 411, 412, 413 to allow for movement of the sliding block 42 relative to the sliding rail 41 and, thus, the pivoting movement of the connecting rod 46 and the footrest 2 relative to the front leg side rods 112.

Figure 11:
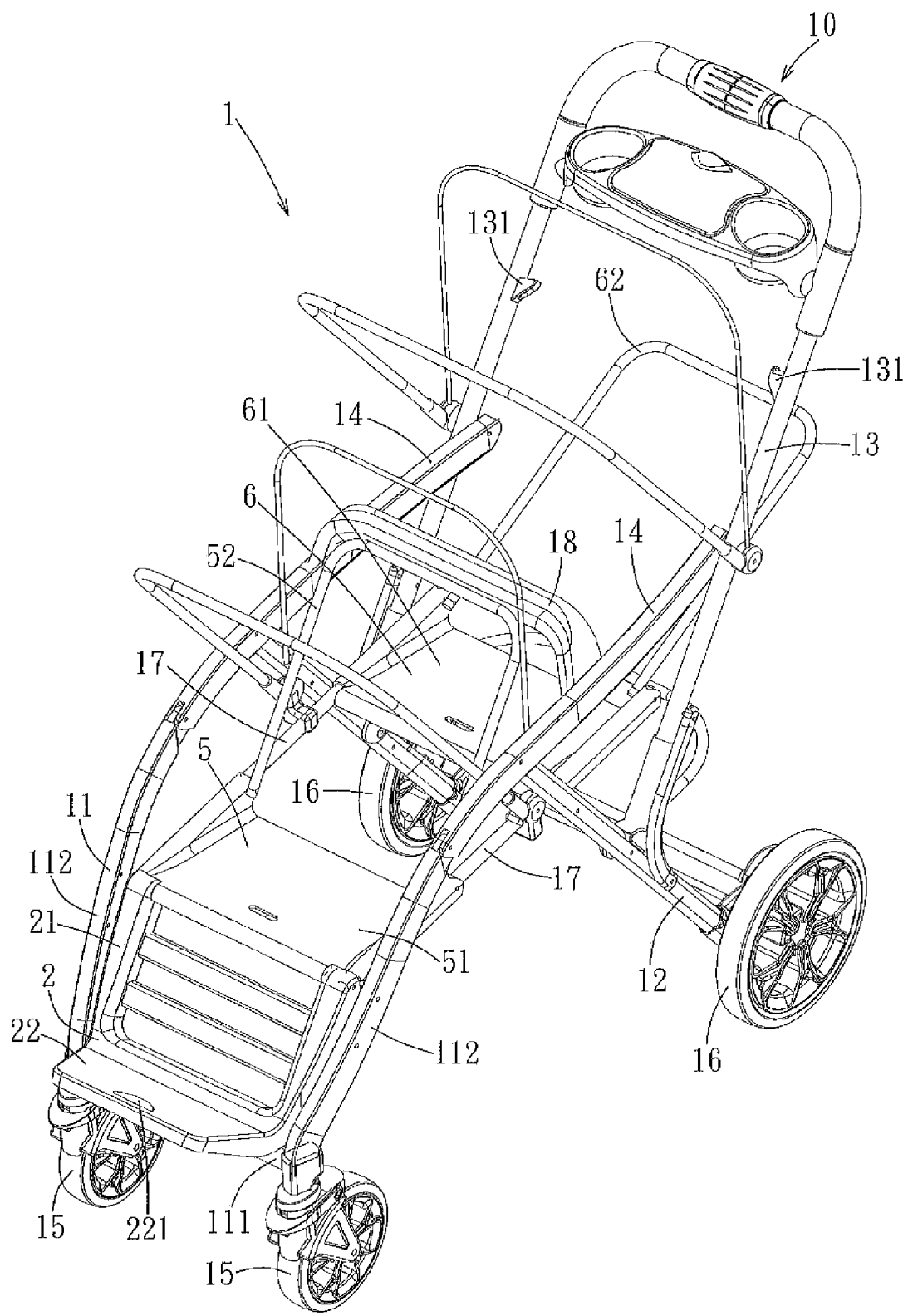
FIG. 11 is a perspective view of the third preferred embodiment of a stroller according to this invention when a footrest is disposed at a second angular position.
Figure 12:
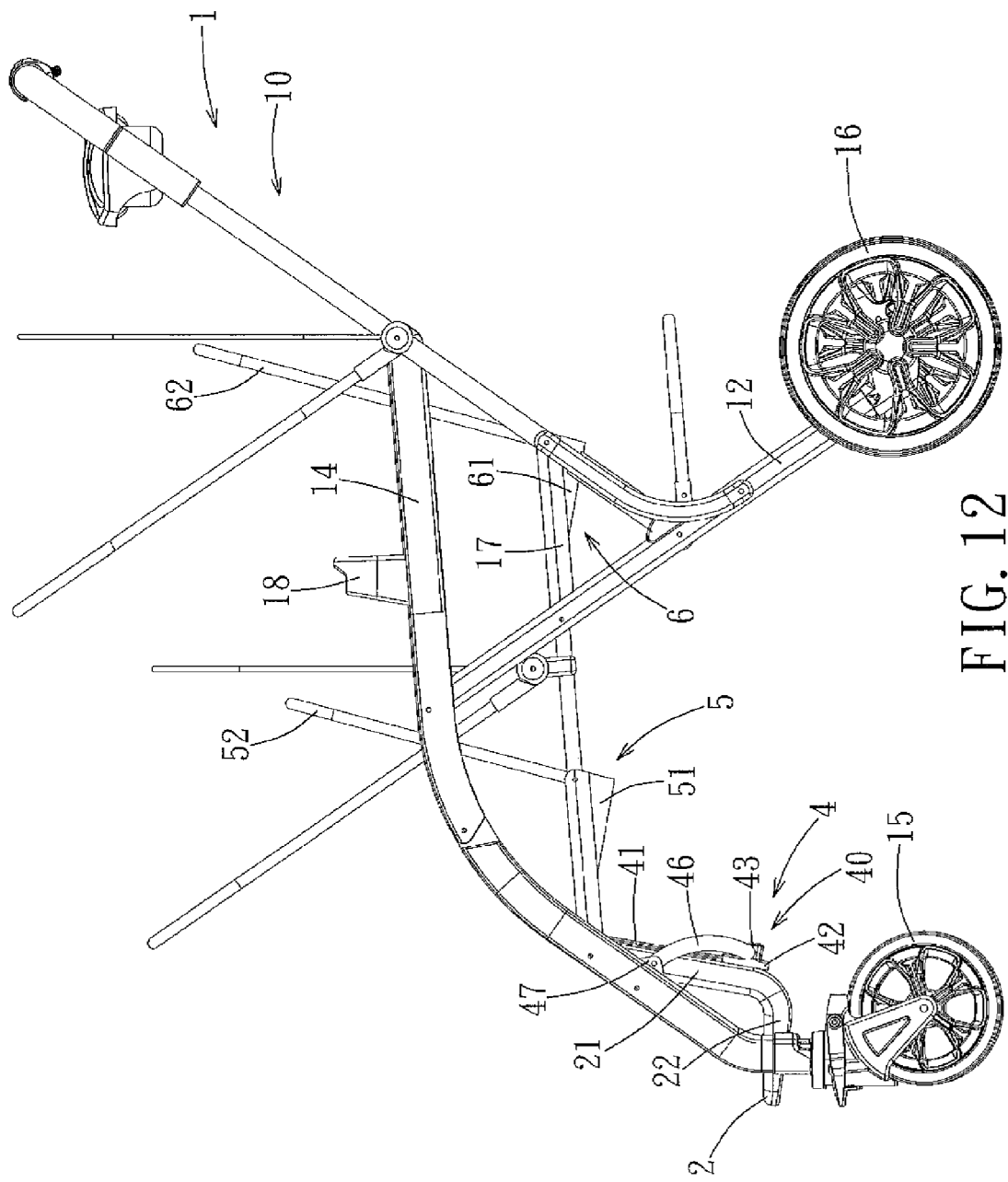
FIG. 12 is a side view of the third preferred embodiment when the footrest is disposed at the second angular position.

With particular reference to FIGS. 11 and 12, when the stroller 1 is used independently (i.e., is not connected with the first and second car seats 9, 8), the footrest 2 is disposed at the second angular position so that the child is seated on the front seat portion 5 and the feet of the child are placed on the footrest 2.

Figure 13:
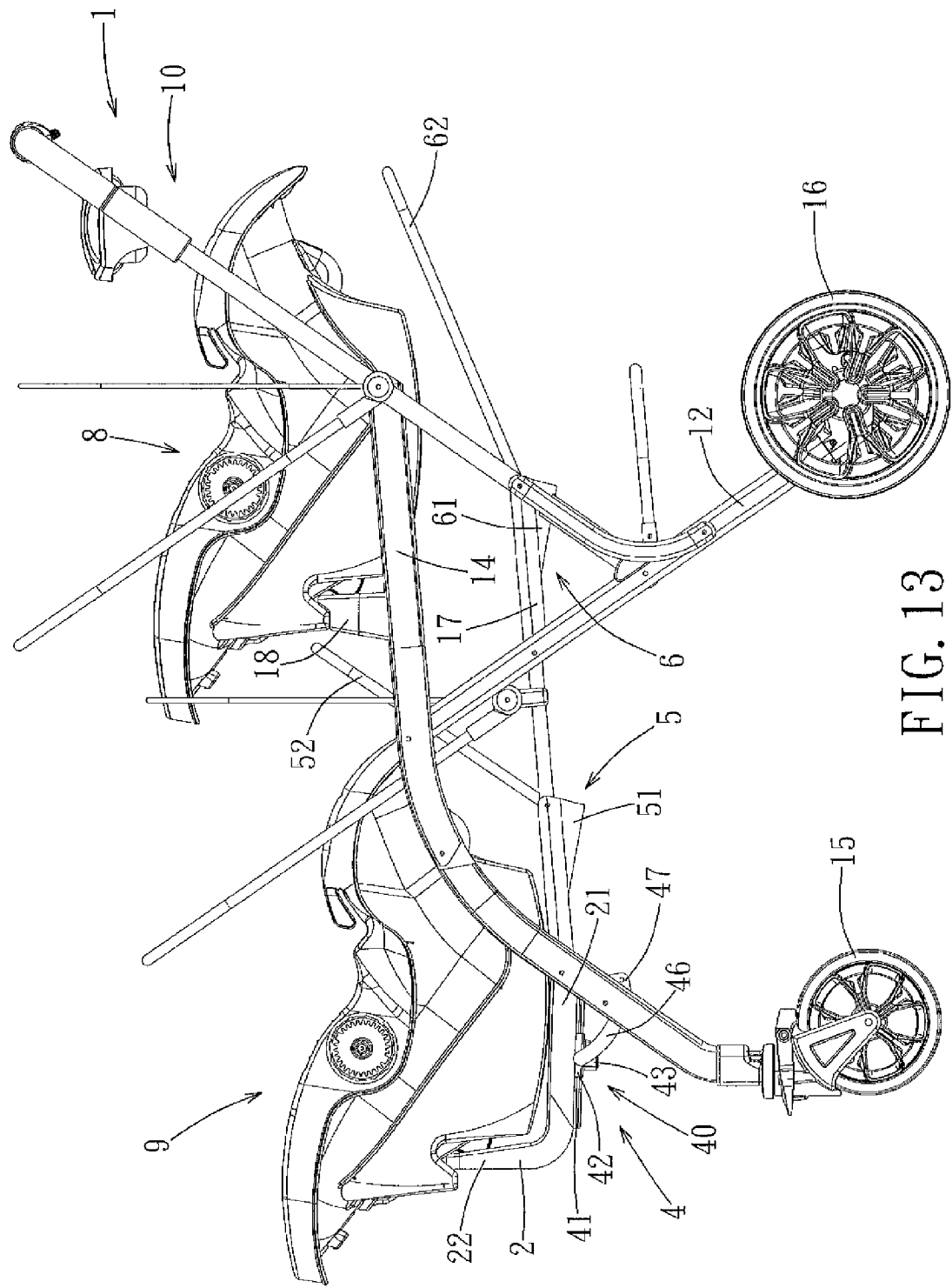
FIG. 13 is a side view of the third preferred embodiment and two car seats when the footrest is disposed at a first angular position.

With particular reference to FIG. 13, when it is desired to connect the first car seat 9 with the stroller 1, the actuator 43 is operated to allow the footrest 2 to be pivoted from the second angular position to the first angular position. In the first angular position, the first car seat 9 and the stroller 1 can be assembled together.

Subsequently, after the first car seat 9 is removed upwardly from the stroller 1, the actuator 43 can be operated again to allow for pivoting movement of the footrest 2 from the first angular position to the second angular position. As a result, the stroller 1 is converted back to the independent use state.

Figure 14:
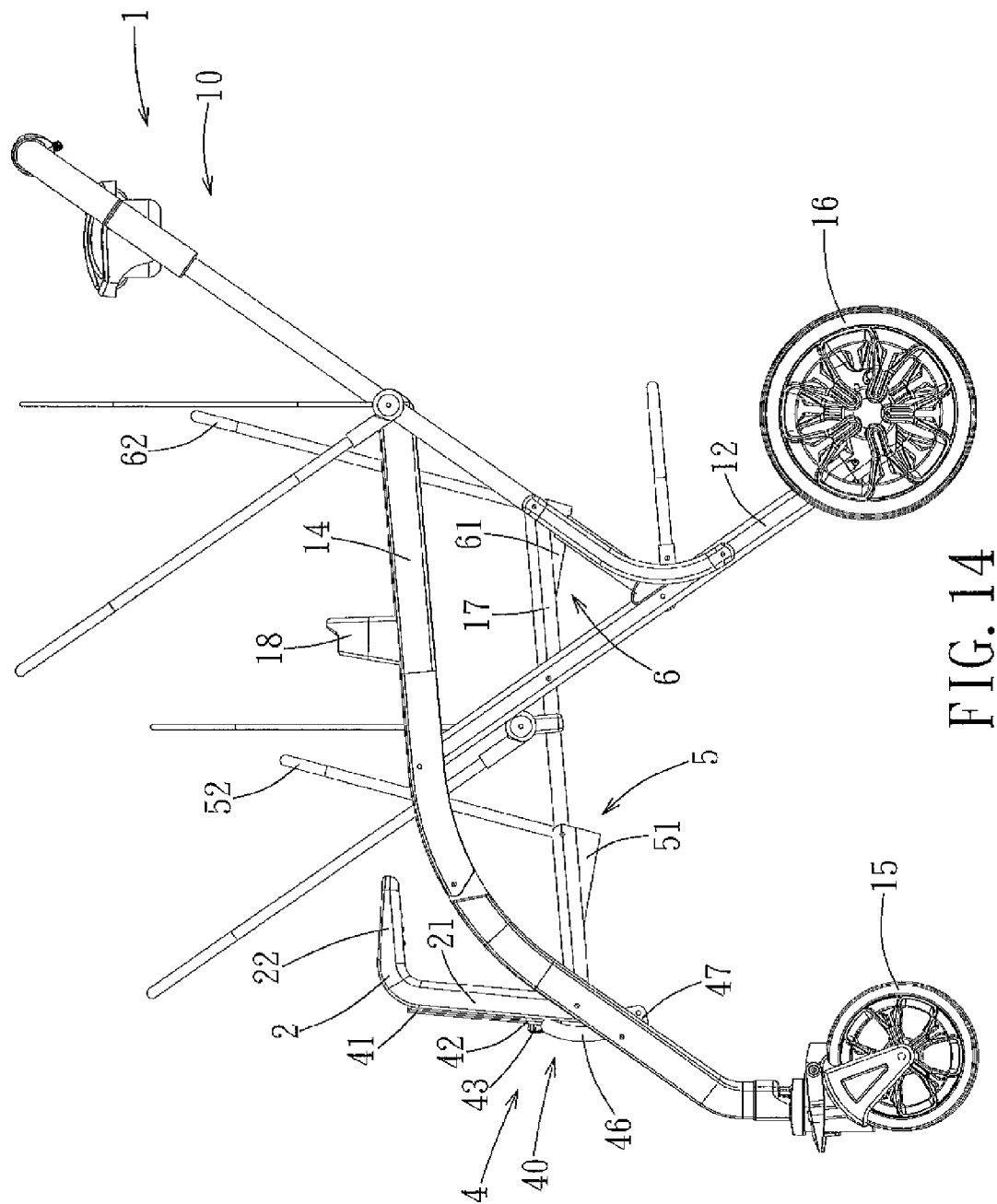
FIG. 14 is side view of the third preferred embodiment when the footrest is disposed at a third angular position.
Figure 15:
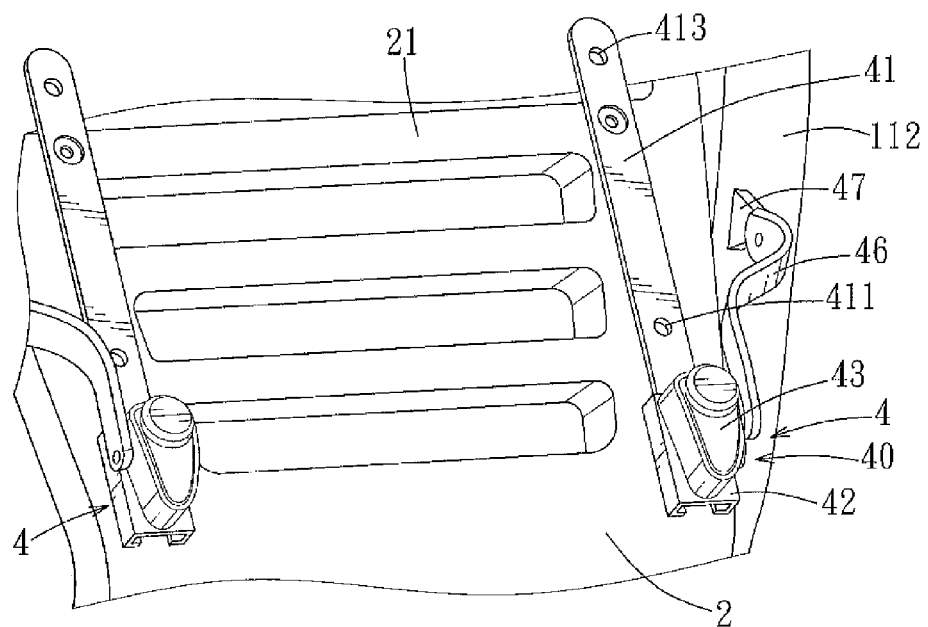
FIG. 15 is a perspective view of two locking devices of the third preferred embodiment.
Figure 16:
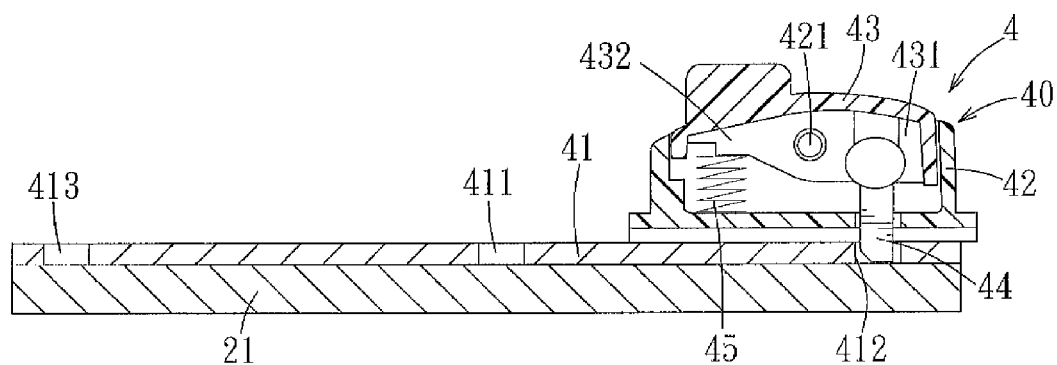
FIG. 16 is a sectional view of one of the locking devices of the third preferred embodiment.

It should be noted that, in this embodiment, when folding of the stroller 1 is desired, the footrest 2 can be adjusted to the third angular position. In this position, as shown in FIG. 14, the space occupied by the stroller 1 can be reduced, thereby resulting in convenience during transportation or storage.

In view of the above, the footrest 2 allows the feet of the child to rest thereon when in the second angular position, and serves as a coupling member for connection with the first car seat 9 when in the first angular position. Thus, the object of this invention can be achieved.

With this invention thus explained, it is apparent that numerous modifications and variations can be made without departing from the scope and spirit of this invention. It is therefore intended that this invention be limited only as indicated by the appended claims.

I claim:

1. A stroller adapted to be connected with a car seat, the car seat including a retaining member, said stroller comprising:
    a stroller frame having a pair of lateral members;
    a footrest disposed rotatably between said lateral members and having a coupling portion; and
    a locking device disposed between said footrest and one of said lateral members and operable to allow for an adjustment to an angle of said footrest with respect to said lateral members, said locking device including an angle-limiting mechanism and a pushbutton operable to allow said footrest to be pivoted relative to said lateral members to a selected one of a first angular position and a second angular position, said angle-limiting mechanism locking said footrest at the selected one of said first and second angular positions when said pushbutton is released, said coupling portion of said footrest being adapted to engage the retaining member when said footrest is disposed at said first angular position, wherein said angle-limiting mechanism includes:
    a first pivot member connected to one of said footrest and the one of said lateral members,
    a second pivot member connected to the other of said footrest and the one of said lateral members and connected rotatably to said first pivot member,
    a positioning member disposed between said first and second pivot members for locking said first pivot member relative to said second pivot members at a selected one of a first locking position where said footrest is disposed at said first angular position, and a second locking position where said footrest is disposed at said second angular position, and
    a resilient member for biasing said footrest to be locked relative to said lateral members, said pushbutton being disposed at an axial end of said angle-limiting mechanism and operable to apply an axial force to said resilient member so as to release said footrest from said lateral members, and wherein said second pivot member includes a pivot shaft extending toward said first pivot member and permitting said positioning member to be sleeved movably on said pivot shaft, said resilient member being disposed between said positioning member and said second pivot member, said positioning member having a first engaging groove and a second engaging groove, said first pivot member being formed with an engaging block engageable with a selected one of said first and second engaging grooves, said engaging block engaging said first engaging groove when said first pivot member is disposed at said first locking position, said engaging block engaging said second engaging groove when said first pivot member is disposed at said second locking position.

2. The stroller as claimed in claim 1, wherein said locking device further includes a first connecting rod and a second connecting rod, said first connecting rod having one end connected fixedly to said first pivot member, and the other end connected pivotally to the one of said lateral members, said second connecting rod having one end connected fixedly to said second pivot member, and the other end connected pivotally to said footrest.

3. The stroller as claimed in claim 1, wherein said first pivot member is connected fixedly to said footrest, and said second pivot member is connected fixedly to the one of said lateral members.

4. The stroller as claimed in claim 1, being a double-seat stroller and further comprising a front seat portion adapted to be mounted with the car seat by said footrest, a rear seat portion disposed behind said front seat portion, and a transverse rod adapted for retaining an additional car seat on said rear seat portion.

5. The stroller as claimed in claim 1, the retaining member of the car seat being configured as a hook, wherein said coupling portion of said footrest is configured as a groove formed therethrough and adapted to allow for extension of the retaining member therethrough.

6. A car seat and stroller assembly comprising:
    a car seat including a retaining member; and
    a stroller including
        a stroller frame having a pair of lateral members,
        a footrest disposed rotatably between said lateral members and having a coupling portion, and
        a locking device disposed between said footrest and said lateral members and operable to allow for an adjustment to an angle of said footrest with respect to said lateral members, said locking device including an angle-limiting mechanism and a pushbutton operable to allow said footrest to be pivoted relative to said lateral members to a selected one of a first angular position and a second angular position, said angle-limiting mechanism locking said footrest at the selected one of said first and second angular positions when said pushbutton is released, said coupling portion of said footrest engaging said retaining member when said footrest is disposed at said first angular position, wherein said angle-limiting mechanism includes:
- a first pivot member connected to one of said footrest and the one of said lateral members;
- a second pivot member connected to the other of said footrest and the one of said lateral members and connected rotatably to said first pivot member;
- a positioning member disposed between said first and second pivot members for locking said first pivot member relative to said second pivot members at a selected one of a first locking position where said footrest is disposed at said first angular position, and a second locking position where said footrest is disposed at said second angular position; and
- a resilient member for biasing said footrest to be locked relative to said lateral members, said pushbutton being disposed at an axial end of said angle-limiting mechanism and operable to apply an axial force to said resilient member so as to release said footrest from said lateral members, and wherein said second pivot member includes a pivot shaft extending toward said first pivot member and permitting said positioning member to be sleeved movably on said pivot shaft, said resilient member being disposed between said positioning member and said second pivot member, said positioning member having a first engaging groove and a second engaging groove, said first pivot member being formed with an engaging block movable relative to said sliding rail to engage a selected one of said first and second engaging grooves, said engaging block engaging said first engaging groove when said first pivot member is disposed at said first locking position, said engaging block engaging said second engaging groove when said first pivot member is disposed at said second locking position.

7. The car seat and stroller assembly as claimed in claim 6, wherein said locking device further includes a first connecting rod and a second connecting rod, said first connecting rod having one end connected fixedly to said first pivot member, and the other end connected pivotally to the one of said lateral members, said second connecting rod having one end connected fixedly to said second pivot member, and the other end connected pivotally to said footrest.

8. The car seat and stroller assembly as claimed in claim 6, wherein said first pivot member is connected fixedly to said footrest, and said second pivot member is connected fixedly to the one of said lateral members.

9. The car seat and stroller assembly as claimed in claim 6, further comprising a front seat portion connected with said car seat by said footrest, a rear seat portion disposed behind said front seat portion, and a transverse rod adapted for retaining an additional car seat on said rear seat portion.

10. The car seat and stroller assembly as claimed in claim 6, wherein said retaining member of said car seat is configured as a hook, and said coupling portion of said footrest is configured as a groove formed therethrough and allowing for extension of said retaining member therethrough.

* * * * *